US000001208H

United States Statutory Invention Registration [19]

[11] Reg. Number: H1208

Burnham et al. [43] Published: Jul. 6, 1993

[54] MOBILE SMOKE SCREENING SYSTEM

[75] Inventors: Michael J. Burnham, Kingsville; Horace W. Pearce, Churchville; William G. Rouse, Aberdeen, all of Md.

[73] Assignee: The United States of America as represented by the Secretary of the Army, Washington, D.C.

[21] Appl. No.: 700,376

[22] Filed: Apr. 3, 1991

[51] Int. Cl.[5] ..... C09K 3/30

[52] U.S. Cl. ..... 252/305

*Primary Examiner*—Robert L. Stoll
*Assistant Examiner*—Daniel S. Metzmaier
*Attorney, Agent, or Firm*—Anthony T. Lane; Edward Goldberg; Michael C. Sachs

[57] ABSTRACT

A minimum hazard visual screening cloud is formed by vaporizing diesel fuel inside a vehicle exhaust manifold pipe which, upon entering the ambient atmosphere, condenses into an aerosol comprised of small droplets, thereby producing a large sustaining cloud which obscures both the vehicle and the adjacent downwind areas.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOBILE SMOKE SCREENING SYSTEM

GOVERNMENTAL INTEREST

The invention described herein may be manufactured, used, and licensed by or for the Government for Government purposes without payment to use of any royalties thereon.

BACKGROUND OF THE INVENTION

This invention relates to a method of forming a visual screening cloud by using the heat of the engine exhaust manifold crossover pipe to vaporize a portion of the vehicle's on-board diesel fuel supply, or any other similar "fog oil" which could be carried on-board in any auxiliary military five galloons fuel cans.

DESCRIPTION OF THE PRIOR ART

Efforts to develop a method to protect individual tactical military vehicles from visual detection with a minimum hazard screening cloud have been underway for a number of years. Various larger vehicles are conventionally equipped in the prior art with smoke grenades and launchers, whereby the grenades are launched from the vehicles to provide a visual screen relative to the vehicles.

SUMMARY OF THE INVENTION

In a preferred embodiment of the present invention, methods are provided to establish, within a few seconds, a cloud which both screens the vehicle and provides a downwind obscurant for the adjacent areas Since the system is mounted upon and contained as an integral part of the vehicle, it is mobile with the vehicle and the vehicle operator is able to initiate the system, and to turn the system off and on as the tactical situation warrants The novel features of this invention, as well as the invention itself, both as to its organization and operation, will be be understood from the accompanying drawing, taken in conjunction with the accompanying description

DETAILED DESCRIPTION

Figure 1:
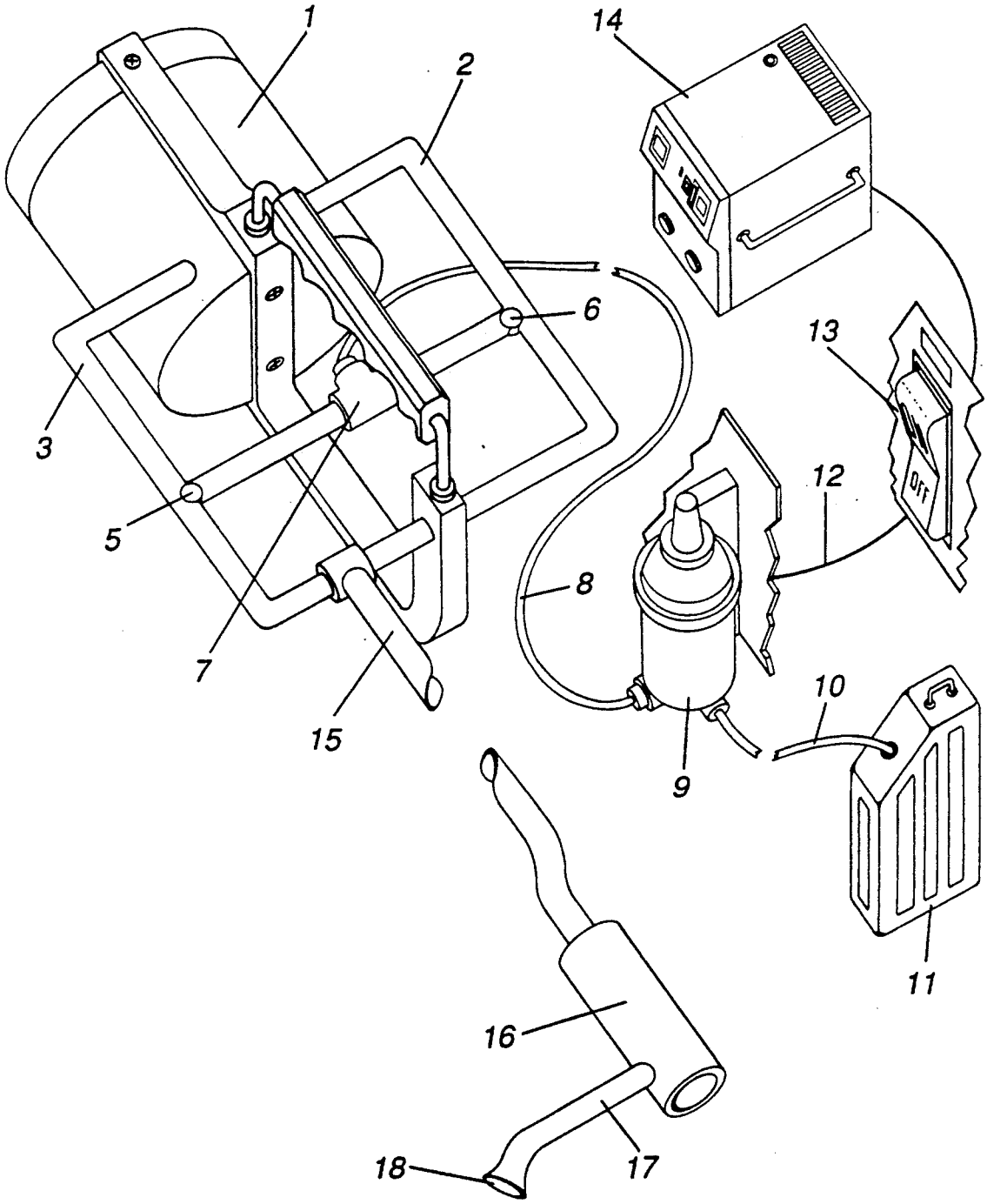
FIG. 1 is a partially perspective plan view of the mobile smoke screening system of the present invention.

Referring to FIG. 1 it is seen that the preferred embodiment of the present invention includes a vehicle motor generally designated as 1. Extending rearward and below the motor 1 are two motor exhaust pipes 2,3 which collect the fuel exhaust from the motor 1 when it is either idling or used in propelling the vehicle. Diesel fuel is preferably used in the motor 1, although other fuels may be used, including gasoline, kerosene, naphtha, etc. The motor exhaust pipes 2,3 extend rearward of the vehicle and are joined into an exhaust line 15. The exhaust line 15 may include an exhaust muffler 16 while extending further rearwardly of the vehicle into an exhaust outlet pipe 17 which terminates in an exhaust outlet 18 for exhausting the fuel emissions which emanate from the motor 1 at the front of the vehicle.

Extending between the two motor exhaust pipes 2,3 at a location rearward of the motor 1 and forward of the exhaust line 15, is an exhaust manifold crossover pipe 4, which is an open connection between the motor exhaust pipes 2,3. At the connections of the exhaust manifold crossover pipe 4 with the exhaust pipes 2,3 are mounted spray nozzles 5,6 respectively. Mounted between the exhaust manifold crossover pipe 4 intermediate the spray nozzles 5,6 is a tee coupling 7 in communication with a fuel line 8 which is connected further to a fuel pump 9. The fuel pump 9 is in communication with a fuel supply line 10, which is supplied with diesel fuel taken from the vehicle's fuel supply, or drawn from a standard five gallon auxiliary military fuel can 11, as shown in FIG. 1 of the preferred embodiment of the present invention. The fuel pump 9 is controlled by an electric control line 12 connected to the fuel pump 9 and activated by a control switch 13 energized by an electric supply of 24 volt standard electric power.

OPERATION

The operation of the mobile smoke screening system of the present invention is essentially as follows:

When a mobile smoke screen is desired, the operator of the vehicle turns on the control switch 13 which energizes the fuel pump 9 to supply diesel fuel from the fuel supply 11 through fuel supply line 10 and fuel line 8 to the exhaust manifold crossover pipe. The fuel pump 9 injects approximately one-third of a gallon of the diesel fuel into the exhaust manifold crossover pipe through the tee coupling 7 and into the two spray nozzles 5,6 which are drilled and tapped into the crossover pipe. Upon entering the motor exhaust, which has an internal temperature approaching 1000° F. as a result of the hot fuel exhaust from the activated motor, the diesel fuel vaporizes and is prevented from flashing or combusting by the depleted oxygen environment present within the motor exhaust pipe. The vaporized material then moves rearwardly and downstream from the vehicle with the fuel emissions exhausting from the exhaust outlet pipe 17 through the exhaust pipe outlet 18 into the ambient atmosphere. Upon entering into the atmosphere the vaporized material condenses into an aerosol of smoke comprised of tiny, persistent droplets producing a visually obscuring screen or cloud. The aerosol of vaporized material is derived from diesel fuel which is very economical in cost when compared with smoke grenades in the prior art. Also, the aerosol of vaporized material has been found to be minimally hazardous to the environment in contrast to the ecologically damaging contents of conventional smoke grenades. The smoke screening system of the present invention is mobile with the vehicle and be both quickly initiated and functioned by the vehicle operator as the tactical situation develops.

It is to be understood that the above description and the accompanying drawing are merely illustrative of the preferred embodiment of the mobile smoke screening system of the present invention, and that no limitations are intended in limitation thereof other than as defined in the appended claims.

We claim:

1. An improved method of forming an obscurant cloud from a motorized vehicle by using the heat of the vehicle motor exhaust, which comprises the steps of:

injecting diesel fuel into the vehicle motor exhaust; and vaporizing the injected diesel fuel to form the obscurant cloud of vaporized diesel fuel upon entry into the ambient atmosphere.

2. The method according to claim 1, wherein the step of injecting the diesel fuel, further includes spraying the diesel fuel into an exhaust manifold crossover pipe mounted on and in communication with the motor vehicle exhaust.

3. The method according to claim 1, wherein the obscurant cloud is an aerosol of the vaporized diesel fuel.

* * * * *